(12) United States Patent
Conti et al.

(10) Patent No.: US 10,330,292 B2
(45) Date of Patent: Jun. 25, 2019

(54) DEVICE FOR CONTROLLING A REMOTELY LOCATED LUMINAIRE

(71) Applicant: Production Resource Group, LLC, New Windsor, NY (US)

(72) Inventors: Christopher D Conti, Rutherford, NJ (US); Ian Clarke, Grapevine, TX (US); Dale Polansky, Duncanville, TX (US); Diane Miller, Grapevine, TX (US)

(73) Assignee: Production Resource Group LLC, New Windsor, NY (US)

( * ) Notice: Subject to any disclaimer, the term of this patent is extended or adjusted under 35 U.S.C. 154(b) by 509 days.

(21) Appl. No.: 15/065,040

(22) Filed: Mar. 9, 2016

(65) Prior Publication Data

US 2017/0009969 A1  Jan. 12, 2017

Related U.S. Application Data

(63) Continuation of application No. 62/190,063, filed on Jul. 8, 2015.

(51) Int. Cl.
*F21V 21/15* (2006.01)
*F21V 9/40* (2018.01)
(Continued)

(52) U.S. Cl.
CPC .............. *F21V 21/15* (2013.01); *F21V 9/00* (2013.01); *F21V 9/08* (2013.01); *F21V 9/40* (2018.02);
(Continued)

(58) Field of Classification Search
CPC ... F21V 21/15; F21V 9/00; F21V 9/40; F21V 9/08; H04N 7/181; H04N 5/2351;
(Continued)

(56) References Cited

U.S. PATENT DOCUMENTS 4,190,464 A   2/1980  Komori et al.
4,527,198 A   7/1985  Callahan
(Continued)

FOREIGN PATENT DOCUMENTS

GB    2132329       7/1984
GB    2499123       8/2013
JP    2010078854    4/2010

OTHER PUBLICATIONS

Martin TrackPod 1.8, Mar. 2001.
Martin TrackPod 2.0 Beta, Nov. 2001.
High End DL.2, Oct. 2005.

*Primary Examiner* — Elmito Breval
*Assistant Examiner* — Glenn D Zimmerman
(74) *Attorney, Agent, or Firm* — Law Office of Scott C Harris, Inc

(57) ABSTRACT

A remote follow spot system includes a remote controller that has separately movable parts that are movable in two orthogonal directions, and a display attached to one of said two separately movable parts. The display receives a video feed from a controlled light, that is controlled to move in the same directions as remote controller. The display hence shows the field of view where the light is pointing. In this way, an operator of the follow spot can control the light without physically being near the light.

10 Claims, 13 Drawing Sheets

(51) Int. Cl.

| | | |
|---|---|---|
| *H05B 37/02* | (2006.01) | |
| *H04N 5/225* | (2006.01) | |
| *H04N 5/232* | (2006.01) | |
| *H04N 5/77* | (2006.01) | |
| *H04N 5/235* | (2006.01) | |
| *F21V 9/08* | (2018.01) | |
| *G06F 3/14* | (2006.01) | |
| *H04N 7/18* | (2006.01) | |
| *H04N 5/247* | (2006.01) | |
| *F21V 9/00* | (2018.01) | |
| *F21W 131/406* | (2006.01) | |

(52) U.S. Cl.
CPC .............. *G06F 3/14* (2013.01); *H04N 5/2258* (2013.01); *H04N 5/2351* (2013.01); *H04N 5/2353* (2013.01); *H04N 5/23203* (2013.01); *H04N 5/23206* (2013.01); *H04N 5/23293* (2013.01); *H04N 5/23296* (2013.01); *H04N 5/247* (2013.01); *H04N 5/77* (2013.01); *H04N 7/181* (2013.01); *H05B 37/029* (2013.01); *H05B 37/0227* (2013.01); *H05B 37/0245* (2013.01); *H05B 37/0272* (2013.01); *F21W 2131/406* (2013.01)

(58) Field of Classification Search
CPC ............... H04N 5/247; H04N 5/23203; H04N 5/23206; H04N 5/23296; H04N 5/2353; H04N 5/2258; H04N 5/77; H04N 5/23293; G06F 3/14; H05B 37/0272; H05B 37/0227; H05B 37/0245; H05B 37/029; F21W 2131/406

See application file for complete search history.

(56) References Cited

U.S. PATENT DOCUMENTS

| | | |
|---|---|---|
| 4,598,345 A | 7/1986 | Kleeman |
| 6,079,862 A | 6/2000 | Kawashima et al. |
| 8,201,974 B1 | 6/2012 | Smith et al. |
| 8,680,972 B2 | 3/2014 | Quadri |
| 9,014,828 B2 | 4/2015 | Martello et al. |
| 9,526,156 B2 | 12/2016 | LaDuke et al. |
| 9,593,830 B2 * | 3/2017 | Conti ................ F21V 9/40 |
| 2003/0151909 A1 | 8/2003 | Sid |
| 2005/0122402 A1 | 6/2005 | Kumaki |
| 2005/0259177 A1 | 11/2005 | Senoo |
| 2007/0268680 A1 | 11/2007 | Lee |
| 2008/0165550 A1 * | 7/2008 | Carmi ............ B60Q 1/0483 362/549 |
| 2009/0003678 A1 | 1/2009 | Cutler |
| 2009/0144646 A1 | 6/2009 | Reese |
| 2011/0164422 A1 | 7/2011 | Chan |
| 2011/0276151 A1 | 11/2011 | Feri et al. |
| 2011/0285854 A1 | 11/2011 | LaDuke et al. |
| 2013/0058398 A1 | 3/2013 | Jiang |
| 2014/0192135 A1 | 7/2014 | Babineau et al. |
| 2015/0345762 A1 | 12/2015 | Creasman et al. |
| 2017/0009969 A1 | 1/2017 | Conti et al. |
| 2017/0045211 A1 | 2/2017 | Conti et al. |

\* cited by examiner

DEVICE FOR CONTROLLING A REMOTELY LOCATED LUMINAIRE

This application claims priority from provisional application No. 62/190,063, filed Jul. 8, 2015, the entire contents of which are herewith incorporated by reference.

BACKGROUND

Manually controlled follow spots have conventionally been controlled by an operator adjacent to the light, manually moving the light using handles on the light. When the light is hung in a truss above the stage, the follow spot operator has also conventionally been seated in the truss. The operator manually moves the light to point the follow spot to follow a performer or item. FIG. 1 illustrates operators also sitting in the truss carrying out the manual control.

The conventional system has a number of drawbacks. It requires one operator per spot. Operators need special training to sit in the truss. It is dangerous for the operator to be high in the truss, and hence special safety precautions are necessary. It is also difficult or impossible for the operators to take breaks during the show. A large amount of space is required for the light and the operators. The truss needs to be designed to handle the weight of the lights and of the operators.

SUMMARY

The present application describes a remotely controlled and monitored follow spot controller, which can be located remote from the follow spot, e.g., on the ground when the follow spot is in the truss and/or at a remote location that is remote from the controller. The controller is moved by the operator. Movements of the controller are monitored by movement encoding devices which translate the movement into electronic signals that are sent to control a pan and tilt controllable light. The movement encoding devices can be devices that produce digital outputs indicative of an amount of angular movement, e.g. a digital encoder, a potentiometer with A/D converter or other. A camera monitors the field of view that is seen by the light. In one embodiment, that camera is attached to the light in order to move with the light. The controller includes a video screen or screens which views the scene that is seen from the light, as the light is moved by movements of the controller. A preferred embodiment of the remote controller operates to control the position of pointing of the light, as well as other parameters of the light, such as the width of its beam or other characteristics of its beam, using an intuitive control which can use the same motions that would be used to move the body of a manually-controlled follow spot. By using this control, any operator who is familiar with controlling using a manual follow spot can control using this electronic remote device.

An aspect receives real-time video into the controller from a camera, e.g., that is mounted on the light, and displays the video on the controller. That same remote controller is also movable to allow moving the light to different positions. The video display screen is attached to the remote controller, and hence movement of the remote controller causes the location on the video-display screen to correspondingly move as the camera attached to the light moves, the field-of-view shown by the camera correspondingly moves.

In another embodiment, there can be multiple screens or multiple windows on a single video screen, showing different fields of view, e.g., different resolution or size videos.

The camera can also be mounted separate from the light, in another embodiment.

Another aspect describes an auto exposure system in the camera, that operates to compensate for significantly varying lighting conditions. Another embodiment uses, an infrared or other motion detection system such as RF tracking, to enable tracking and other functions in low lighting conditions.

DETAILED DESCRIPTION

The embodiments describe a remotely controlled and monitored follow spot controller and system. Control of the light is carried out from any location, but most preferably from a location on the ground, remote from the light. A key advantage of this remote follow spot system includes that it allows an operator to control a follow spot without being in a dangerous location such as high above the show venue in a truss. Another advantage is that this can be used in places where traditional or conventional follow spots cannot be used.

Figure 1:
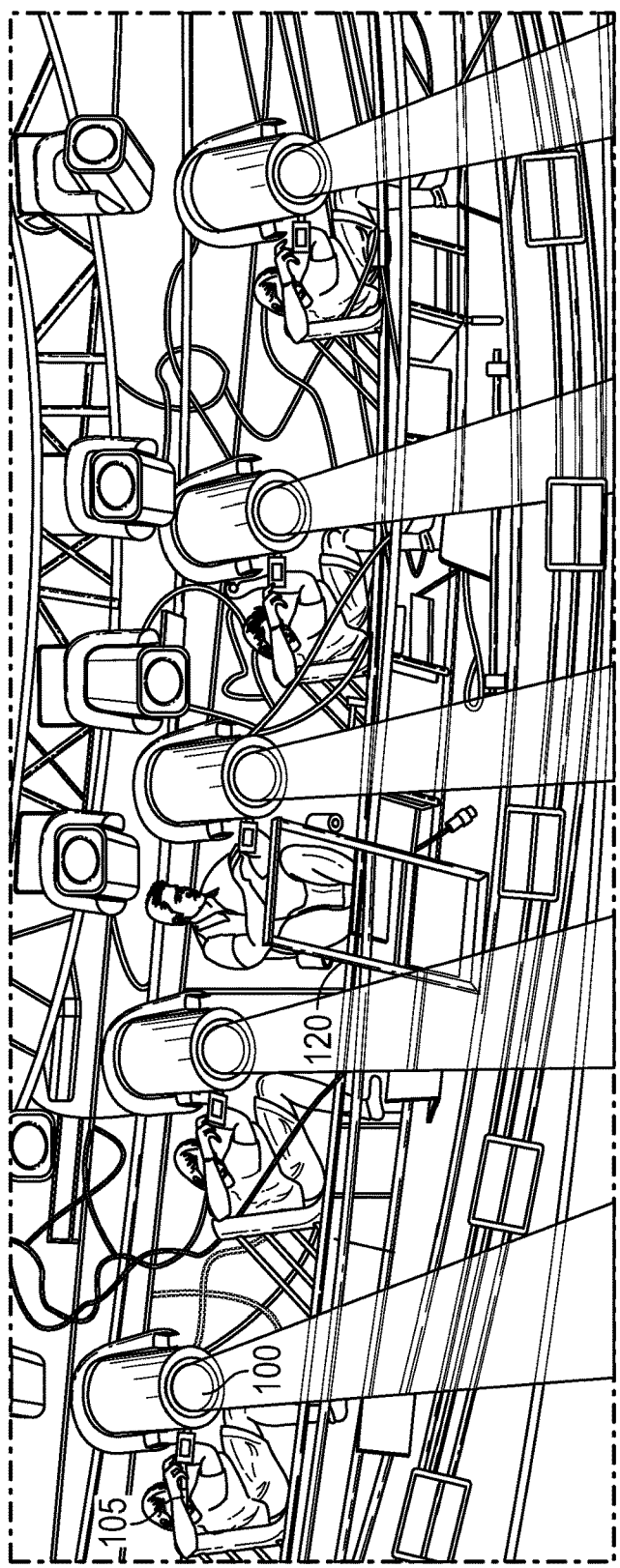
FIG. 1 shows a conventional Followspot system with operators manually holding handles of followspots while sitting in the truss is adjacent the followspots.

FIG. 1 shows how follow spots have historically been operated. The spots are located in a truss, far above the stage. Each of the spots such as 100 has handles 105 that allow manually moving the spot. Each spot also has an operator 120 who holds the spot and moves it manually to follow the desired moving item on the stage. For example, the spots can be used to follow a moving performer, with the operator manually watching the performer, watching the location of the output of their spot and manually moving the spot.

This remotely controlled followspot system allows controlling the position of a remote light, while watching an image of the actual scene illuminated by the light. As the light is moved, the field-of-view that is illuminated by the light also changes. This provides video which can be displayed to an operator as feedback about where the light is pointing.

A camera is used to obtain a real time video image of the scene being illuminated by the light. In order to minimize bandwidth and complexity, alternatives such as stop motion video, or images taken at intervals can be used in place of video.

A first embodiment describes using a touchscreen tablet, such as an iPad, to control the moving position of the light. In this embodiment, the user can view the image seen by the camera on the screen of the ipad. As the light moves, the illuminated image moves, which can be seen on the screen.

The user can move their finger on the touchscreen in order to move the position of pointing of the light. The display screen converts movement of the finger on the display into a light controlling protocol, such as DMX, and sends that command to the remote light. For example, when the operator moves his or her finger up on the screen, this is converted to a signal indicative of move the light up, and sent to the light. The light correspondingly moves up, and the real-time video then shows the light pointing at a different or illuminating a different location. Similarly, the user can move their finger left to right in order to pan the light, or any other combination.

The inventors, however, found that a disadvantage of this system is that it is hard to use. An operator who is accustomed to moving a manually controllable Followspot system needs to learn to move their finger just the right way on the screen. In addition, it was found that holding the user's finger on the screen may cover a portion of the screen that the operator needs to see in order to properly control the light. Removing the finger from the screen, however, causes the light to stop moving.

Another embodiment, described herein, forms the controller from a dual axis movable device. In one embodiment described herein, the controller has the same basic shape as the Followspot itself, with handles in locations which are analogous to those that they would be on a manually controlled Followspot.

A key advantage of this embodiment, using a controller that is shaped to mimic a dual axis movable light, includes that it provides an intuitive ground-based control for a follow spot that allows an operator to operate a follow spot without being in a dangerous location such as high above the show venue in a truss. Another advantage is that this can be used in places where traditional or conventional follow spot cannot be used. Yet another advantage is that since an intuitive control is used, experienced operators can control using the ground-based controller, without significant or any training.

The remote control according to an embodiment can be located anywhere, and is preferably located on the ground, allowing a remote luminaire, e.g., a truss-mounted luminaire, to be controlled via the dedicated controller that is on the ground. The controller is movable. Movement of the controller causes the fixture to move. The fixture as controlled becomes able to be controlled based on a remote control that can be located distant from the light, thus preventing the necessity to put the operator in the truss.

This system provides significant advantages. It provides lighting designers with total creative freedom to put followspots in places that were either previously unusable or involved complex rigging. With the Remote Followspot System, the operator is on the ground so the physical footprint of the fixture can be smaller, and need not have an area or space for the operator. In one embodiment, the fixture is 30 inches round and weighs only 172 lbs. Because of this small footprint and low weight, fixtures can be placed in a wide variety of positions. For example, these remotely controllable followspots lights can be put on balcony rails or on box booms in a theater. The lights can be yoked out over a video wall instead of hanging in front of the wall, which could potentially block viewing access to the video wall. Lights can be hung on box trusses in low trim venues like convention centers and hotel ballrooms. Lights can be ground supported on a lift or a truss tower. Lights can be hung in a theater on a system pipe in a counter weight fly system. Lights can be placed on the floor of a stage to follow overhead flying.

An embodiment uses a remote controller that is shaped like a miniature light yoke. The controller is moved in the same way that the light yoke would have been moved, and those movements are translated into movements of the light. This control is hence an intuitive control station that mimics the typical form factor and familiarity of a traditional followspot. This enables both experienced and novice users to use the Remote followspot Controller with minimal instruction and total confidence. The Remote followspot Controller has a monitor on the moving yoke whose movements are sent to and mimicked by the Remote Spot in the air. Hence, the view seen through the monitor follows the view that would be seen if the operator were on the truss operating the light.

A first embodiment describes a movable follow spot controller to create outputs to control a standard theatrical automated luminaire, and to receive video signals from a camera mounted on the same light. The controls can be produced in DMX, Artnet, or sACN for example, and real time video is received. Any theatrical automated fixture which can have its pointing direction moved in pan and tilt directions based on remote controls; and can have its lighting characteristics modified based on electronic commands, can be used. A first embodiment modifies an existing fixture for these purposes.

Another embodiment describes a purpose built fixture, which has all of these features built in.

In one embodiment, the fixture uses CMY color mixing, and is further optimized for followspot work by having two dedicated color correction wheels, a CTO, and a CTB wheel. The color correction wheels include filters for controlling a "color" of output light.

Figure 2:
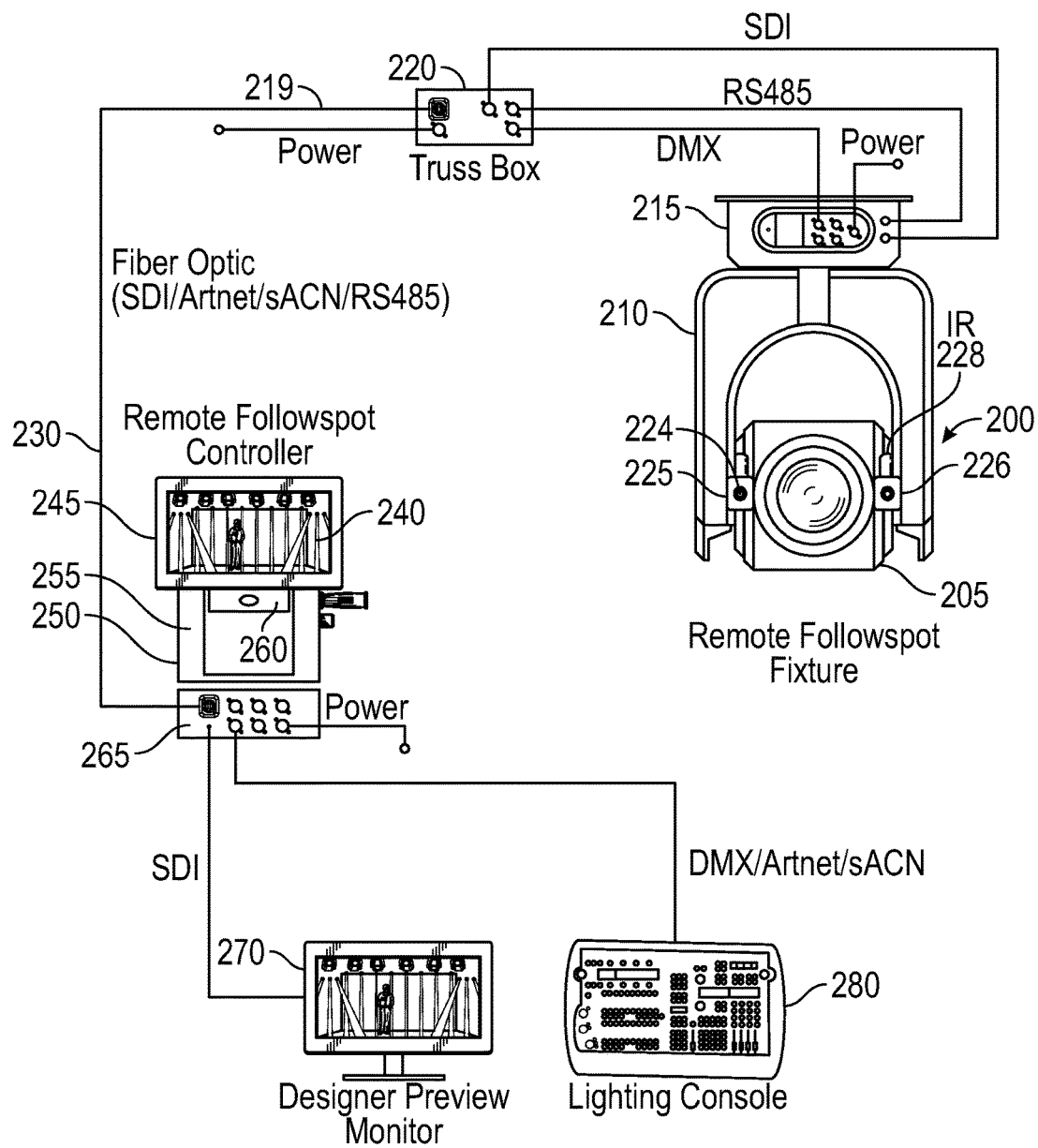
FIG. 2 shows a block diagram of a first embodiment, showing the controller, the controlled light, and the ancillary parts.

FIG. 2 illustrates a block diagram showing an embodiment, where that embodiment covers both the purpose-built fixture and the retrofit fixture. In the purpose built fixture, the electronics to carry out many of these functions are built into the light. In another embodiment, a Truss box is used, which is remote from the light, but communicates with the light, and carries out many of the functions needed for the remote connection. This embodiment uses a controller which is physically separated from the light fixture 200, which is a remotely controlled pan and tilt controllable lighting fixture, having a lighting head 205 that is movable in pan and tilt direction on a yoke 210. A truss attachment and electronics module 215 receives both power, and remote control signals including signals in formats of DMX, RS-485, SDI, Artnet, sACN, SAC and and/or RS-485, more generally can be any form of network protocol including ethernet. The controller is mounted on the ground, while the light is mounted on a truss, in one embodiment. The controller controls all light parameters via standard communication protocol, via a control signal sent from the controller to the light. The light, on the other hand, includes a camera mounted on the light which sends back video signals to the operator to view the light aiming or to project the image in real time, or delayed. The movement of the light mimics the movement of the controller as if operating a conventional spotlight. At the same time, the movement of that light is reflected in the video screen which is mounted on the light.

These signals can be routed by wires 219 via truss box 220, for example when the fixture is mounted on a truss above a performance. The signals can be routed using ethernet wires, fiberoptic, or Alternatively, the signals can be sent wirelessly, for example.

The fixture 200 also includes cameras 225 and 226 that are attached to the lighting head 205, to move in conjunction with the moving of the lighting head. The cameras receive the same field of view that would be seen from the fixture. The output of the camera 225 is coupled into the electronics module 215, and images and/or video received by the camera may be returned over the SDI interface. Alternatively, any other video protocol can be used, including DVI, HDMI, AVI signals, compressed video such as divx, mpeg and matroska, or any other format.

Another embodiment described herein, includes the cameras located adjacent the fixture rather than on the fixture. The cameras can also include pan and tilt capability, and are moved in directions that mimics the movement to the fixture.

Yet another embodiment, uses cameras that are not movable, and which obtain a view of the entire scene being controlled. These cameras, for example, can be used to monitor many different lights, since the operator who views the camera output can see the position of each light on the scene.

In one embodiment, the camera output can be color-coded to indicate which light is which, for example each spot can be color-coded by the computer to indicate its origin.

In one embodiment, more than one camera is used. One of the cameras 225 provides a wide field of view and another of the cameras 226 provides a magnified narrow field of view. The cameras thus provide a real time video feed that is shown on the display screen 245 of the controller. In another embodiment, a single camera is used.

In one embodiment, the cable 219 is a fiber-optic cable between the remote follow spot controller 240 and the fixture 200. Of course, other network connections can be used.

The feed from the video cameras is displayed on video display 245 which is located adjacent the remote controller 250 and is preferably attached to a moveable part of the controller, so that the video screen moves as the controller is moved.

Manually controlled follow spots often use an externally mounted site/reticle, such as a "Telrad" device. However, this device can use an electronic annotation on the screen in order to carry out the radical function. In this embodiment, An adjustable targeting reticle can be overlaid on the video image in order to assist with aiming. The targeting reticle can be moved by the operator, to any location on the video screen. For example, the targeting reticle can be maintained on an actors head for example, and the operator tries to move the controller in order to maintain the reticle at the proper location. The operator can also move the location of the reticle on the screen, thereby keeping the target in a desired location relative to the spot. As shown, the remote controller 250 in this embodiment is generally in the shape of a yoke 210 of a moving light. The yoke on the controller has a generally U-shaped yoke part 255 similar in form to the yoke 210 of the follow spot fixture. The yoke 250 is movable in the same way that the yoke 210 on the fixture would be movable should an operator be located in the truss. The controller also has a simulated lighting head 260, that is also movable and is similar to the lighting head 205 on the fixture. The yoke 255 and head 260 of the remote controller are movable by an operator, in the same way the operator would move the actual head of a follow spot.

Movement of the controller in two dimensions is monitored by pan and tilt movement encoding devices. These movement encoding devices can be encoders or Any other device that encodes movement into a signal. Exemplary versions of these devices can include a potentiometer whose output is connected to an A/D converter. Another example can be a piezoelectric encoder that encodes the movement into a signal, and that signal again can be A/D converted. Any device which converts movement into an electronic signal can be used as the movement encoding device. The movement is translated by the electronics 265 into a control signal, e.g., in DMX, Artnet, RDM, ACN or sACN or any other lighting control format, either known or custom created, that is sent to the follow spot fixture 200. Moving the remote 250 thus causes the light 200 to correspondingly move. The movement causes the scene obtained by the camera(s) 225, 226 to change. The video from these cameras is sent back to the controller 250 and displayed on the screen 245 of the controller 250. Therefore, as the operator moves the lights, that operator sees in real time, the movement of the scene of the light on the screen 245.

One problem recognized by the inventors of the present invention is that the conditions of a show of this type can vary quickly between blackout and well lit conditions. The human eye is very good at adjusting quickly, but cameras less so. In one embodiment, at least one of the cameras 225 includes an automatic exposure control 224 that irises up and down quickly in order to quickly adjust for varying lighting conditions. The exposure control can be an iris. In another embodiment the exposure control can be electronically operable, such as an electronic blooming control. The exposure control can be adjusted by a user using the controls described herein, or can be automatically controlled based on a sensor that detects the amount of illumination.

The cameras also are manually and or automatically focused.

Another embodiment provides cameras 225, 226 that are able to zoom in and out based on a control signal from either the controller 250 and/or a separate lighting console 280 that is connected.

In another embodiment, an infrared illumination source 228 can be used to aid in both targeting and illumination during black out conditions. For example, a thermal imaging camera can be used for targeting during completely black conditions.

All control signals from the controller and video from the fixture travel either on a single and/or multicore fiberoptic cable and or multiple control cables. Multiple controllers and fixtures are thus able to reside on a single network.

A Designer Remote station includes a preview monitor 270 that displays the video feeds from one or more controllers 250, and a console 280. The console can be used to control many of these functions, including, for example, exposure control.

The console can carry out many functions, but in one embodiment, the console assigns which lighting parameters are controllable by the remote controller, and which are controlled by the console. The console may be able to take control of any or all lighting parameters. For example, an operator of console 280 may dim some of the lights in the show; for example the console needs to dim 10 of the lights or all of the lights or some other subset. The console takes control of those 10 lights for dimming. During this time, the controllers 250 for the respective ten lights may still be controlling the pan and tilt position of those lights. The console dims those 10 lights. When finished, the console may transfer dimming control back to the respective controllers 250.

There are also intuitive controls for Intensity, Iris, Zoom, Frost and Edge as well as buttons that can be used for color and beam presets. The Followspot Controller also has an on board touch screen for easy addressing, configuring, and diagnostics. The whole Controller sits on a robust adjustable tripod and has PowerCon in and through, XLR Spin in and through, as well as a BNC that outputs video in any desired format. The Video out is a direct feed from the camera on the Remote Spot and gives designers the added flexibility to use the feed for other functions, such as routing to an LD Followspot Preview Monitor, or others.

Figure 3A:
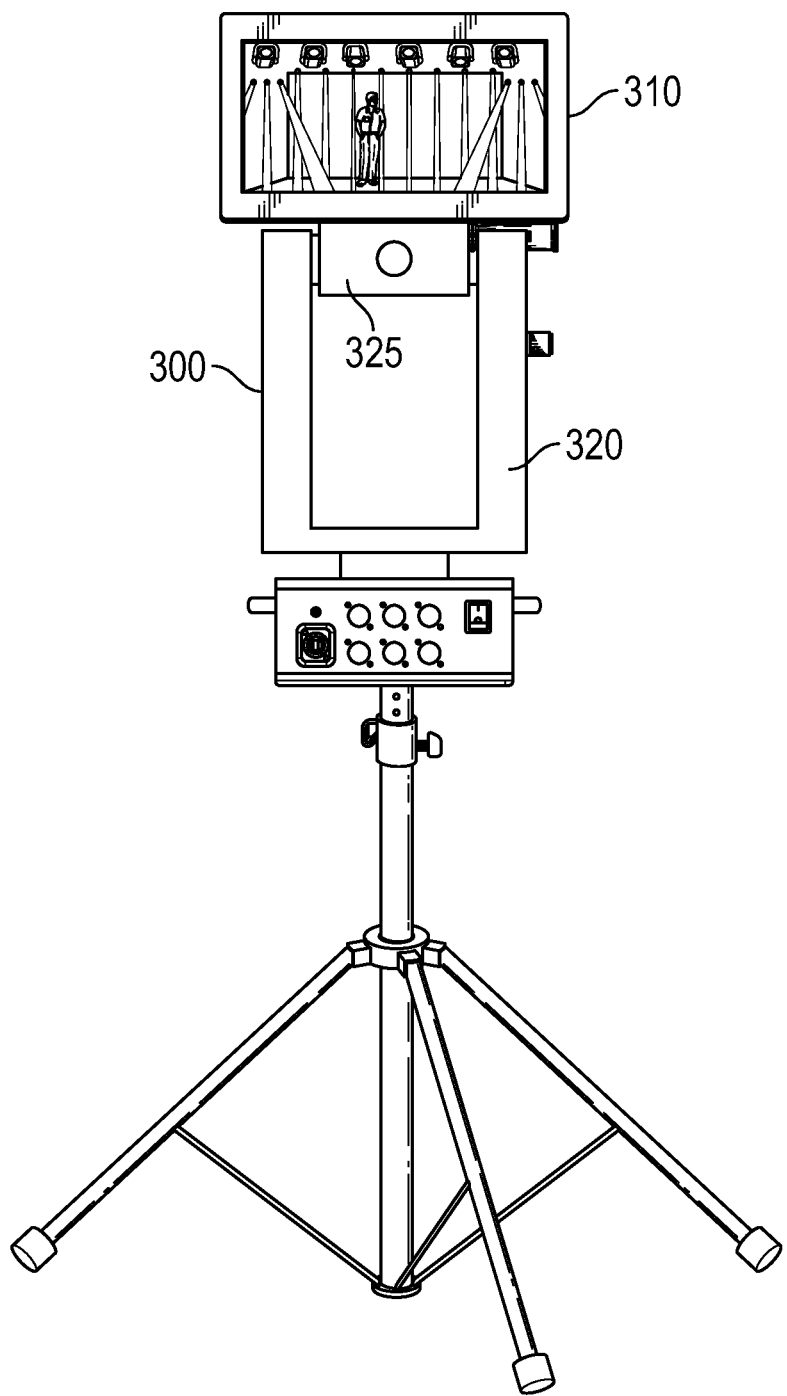
FIG. 3A-3E show different views of the controller.
Figure 3B:
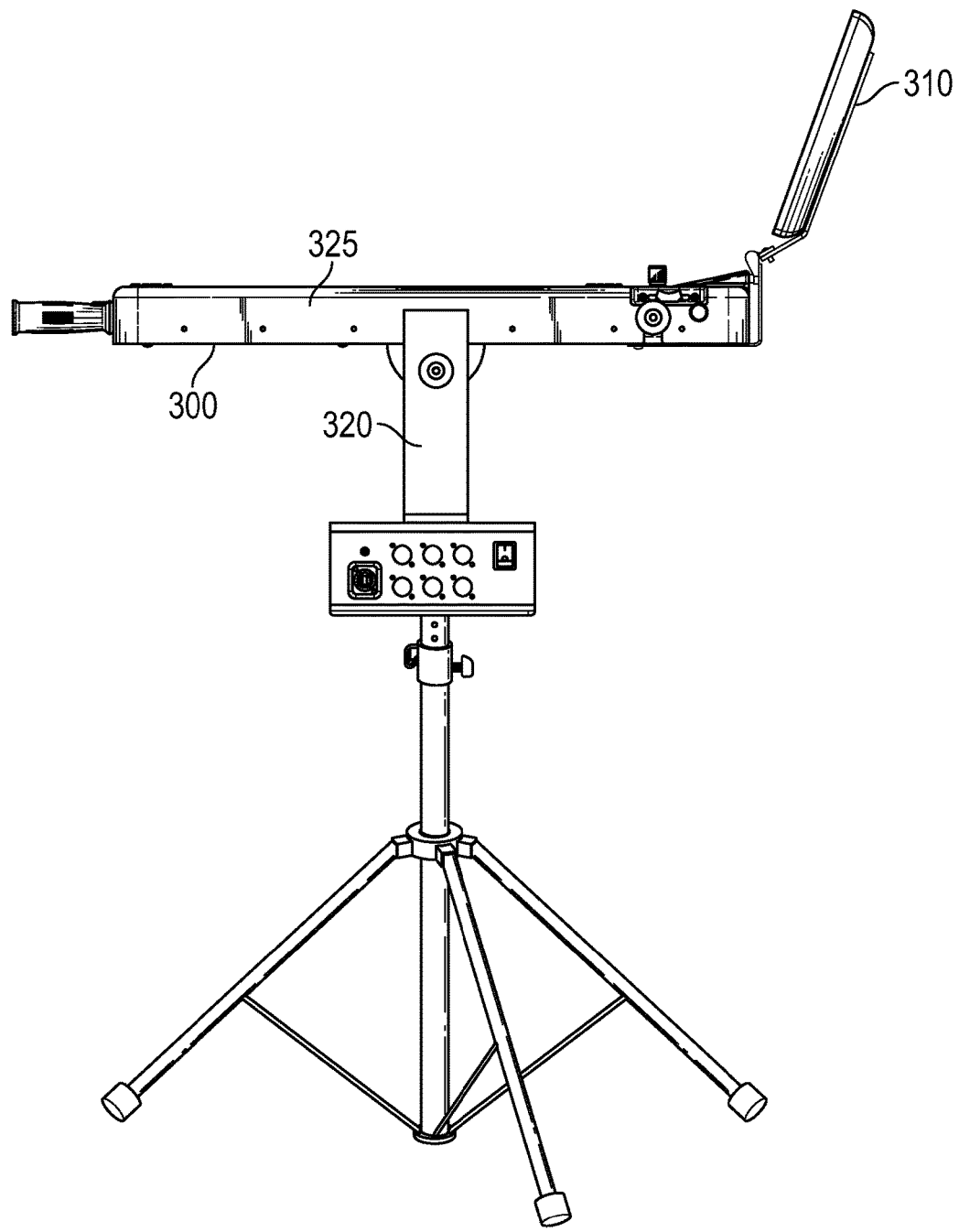
Figure 3C:
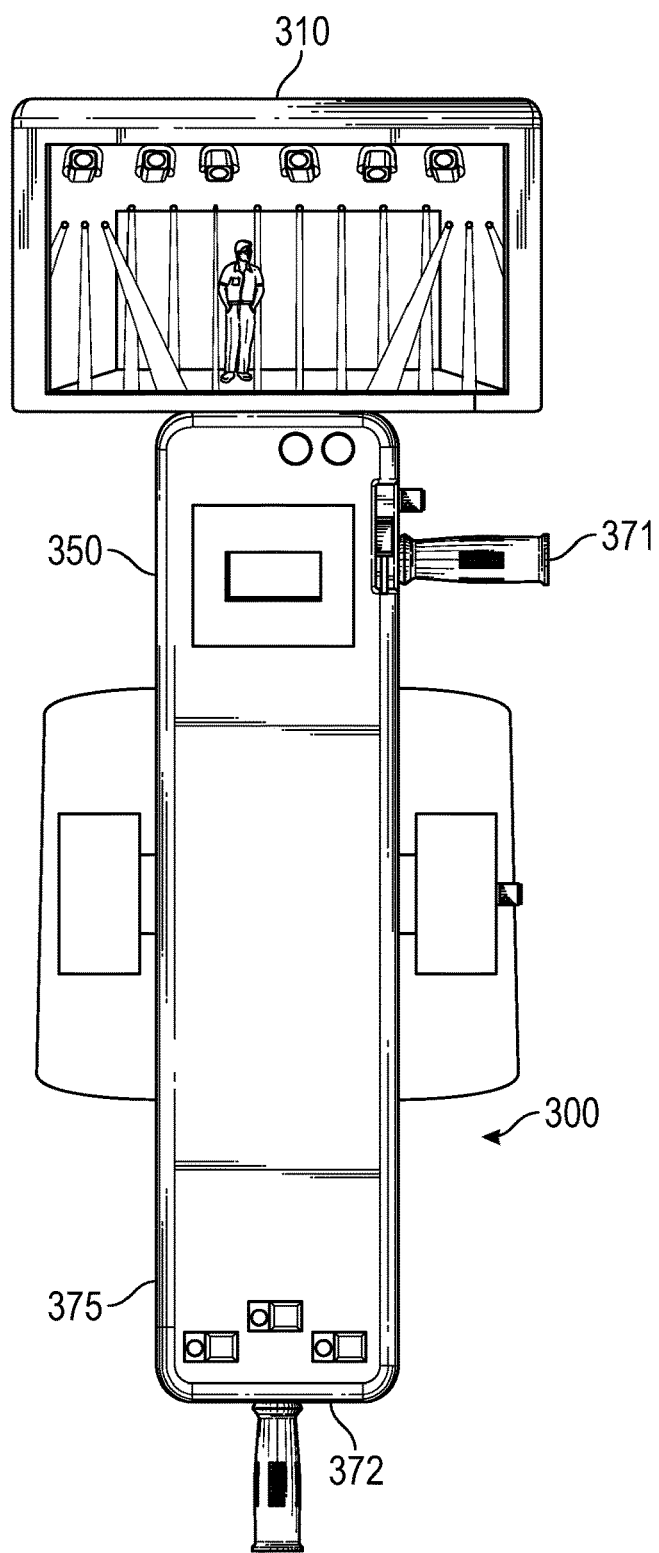

The remote movable controller 300, as shown in more detail in FIGS. 3A, 3B and 3C, is in the shape of an ergonomic yoke that has handles 371 and 372 that allow the remote movable controller to be manually moved by an operator, with the first handle 371 movable to push the pointing position up and down, and the second handle 372 movable from side to side. The user can receive instant feedback on the screen 371, which shows a video of the pointing position of the light as its movement is controlled. The controller also has controls to control multiple functions including Intensity, Beam, Color and Gobos commonly found in Theatrical Automated Luminaires.

The controller has several control modes. The first mode is fully manual in which all functions are controlled locally by the operator. The second mode is Semi-Manual. In this semi-manual mode, the local operator only has control of limited functions such as pan and tilt. A lighting console 280, via a DMX512, Artnet, and or sACN link, controls all other functions. A third Mode is Target mode. In this mode a lighting console pre aims the Pan & Tilt helping a local operator with aiming and picking up an artist or desired object to be illuminated. Once the fixture has been pre aimed, all functions are controlled locally by the operator who is holding the lamp controller 300.

FIG. 3A shows the yoke controller 300 connected to video screen 310 that shows the real-time video from the pointed-at direction of the fixture. The yoke portion 320 can be pivoted side to side in order to control changing the pan direction of the light. Similarly, the head portion 325 can be moved up and down to control changing tilt direction of the light.

FIG. 3B shows a side view of the controller. The body of the controller 325 is moved side to side and up and down to cause corresponding movement of the light.

Figure 3D:
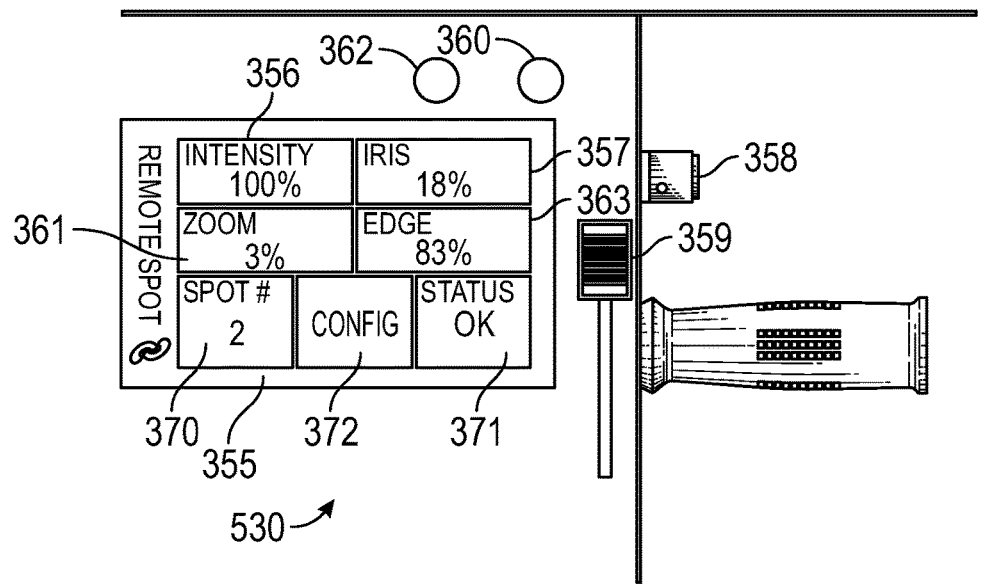

FIG. 3C shows a top view. The controller can also include a touchscreen controller/monitor 350 which also indicates the amount of certain parameters. The touchscreen controller 350 is shown in further detail in FIG. 3D. Touchscreen controller 350 in FIG. 3D provides details about the light.

The indicator shows different parameters, described herein. Intensity of the light output 356 is shown as a percentage. Iris amount 357 is also shown as a percentage. A fader 358 on the side of the controller allows the operator to manually control the amount of iris closure. The iris can also be automatic. Alternatively, other exposure control structure can be used in place of the iris.

There is also a dimmer control encoder 359. As can be seen, the dimmer control encoder 359 is set at its full on position in FIG. 3D, thus causing the intensity to show as full on.

A zoom control 360 can also be used which provides the amount of zoom indicated on the screen as 361. Similarly, an edge control 362 is indicated on the screen as 363. The screen 355 also shows information about the light including the number of the light 370 and its status 371. This can be configured via selecting the configuration screen 372.

Figure 3E:
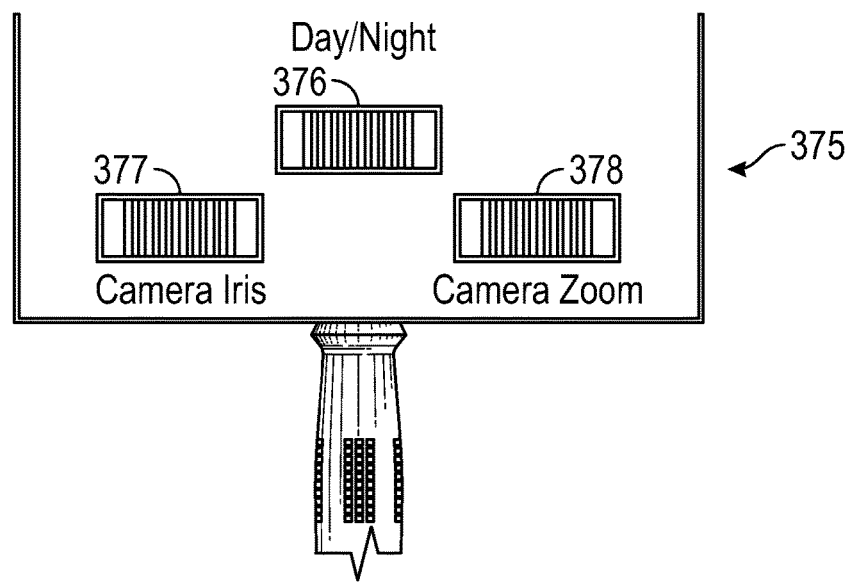

Additional controls 375 are also located at the bottom and of the side of the yoke. A detail of these controls is shown in FIG. 3E. These controls include, for example, camera iris 377, day/night control 376, and camera zoom 378 amounts.

In night vision mode, the IR tracker can track the desired spot on the stage e.g. a performer in low light conditions. The camera iris can be used to prevent being "blown out" when the light comes on quickly. The night vision mode enables operators to pick up a performer on a virtually black stage. The controls also include a targeting reticle.

Figure 4:
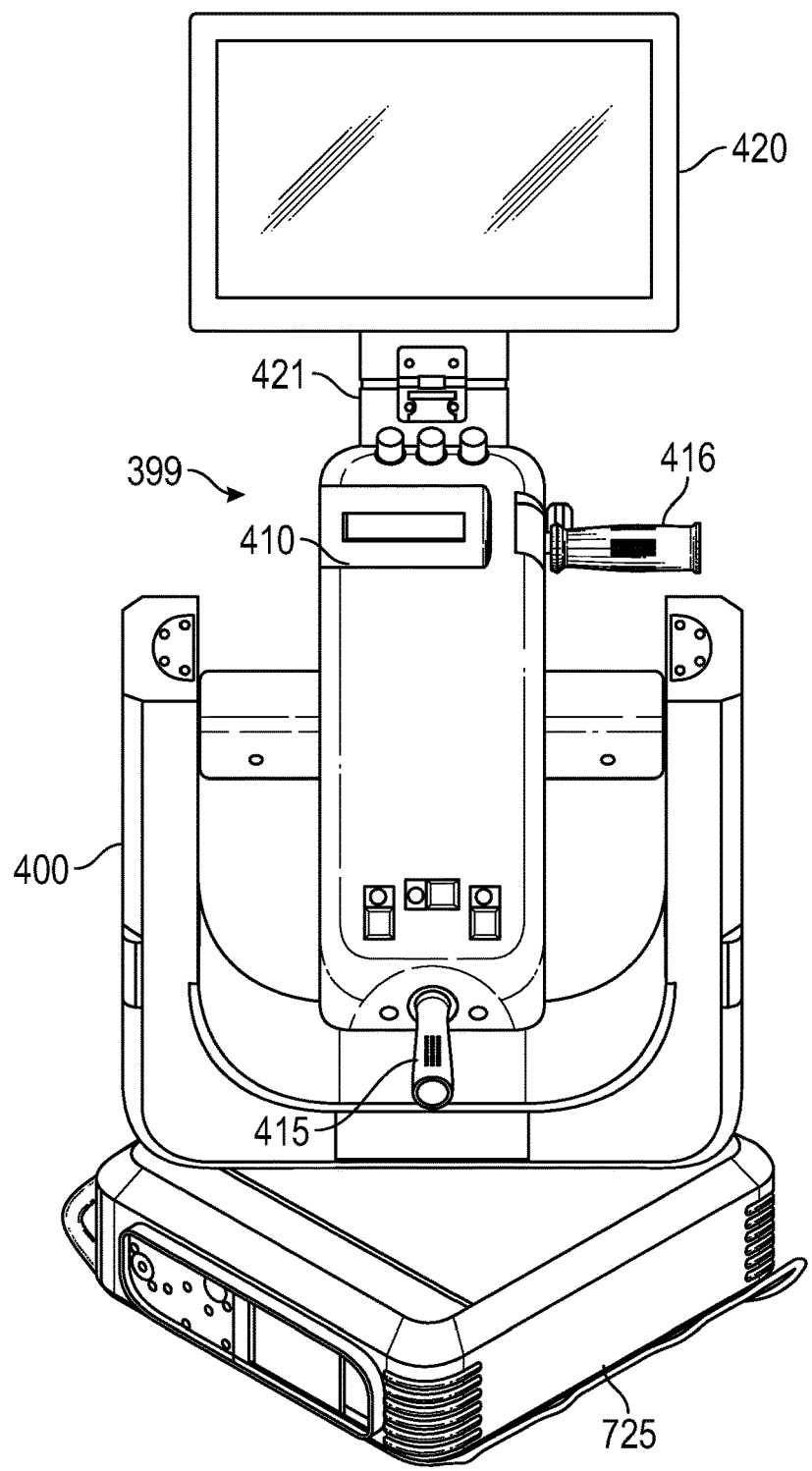
FIG. 4 shows a view of the controller and how it has two parts which pivot in different directions.
Figure 5:
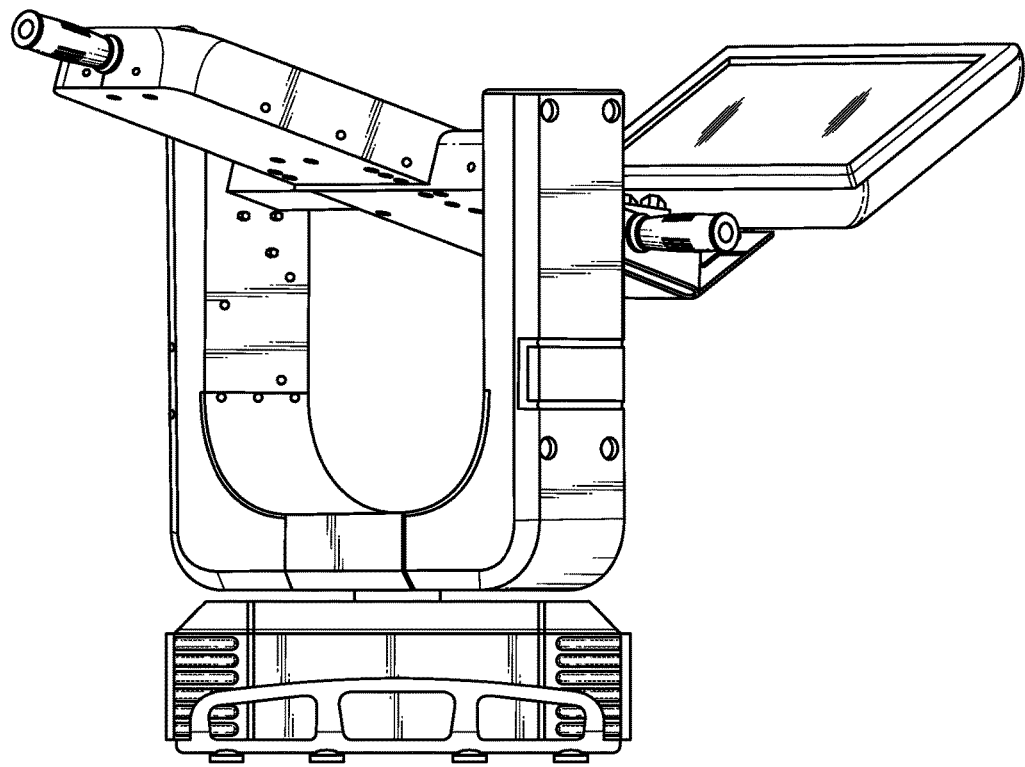
FIG. 5 shows the controller pivoted to an additional direction and shows how the display screen can be pivoted to be viewable in this different direction.
Figure 6:
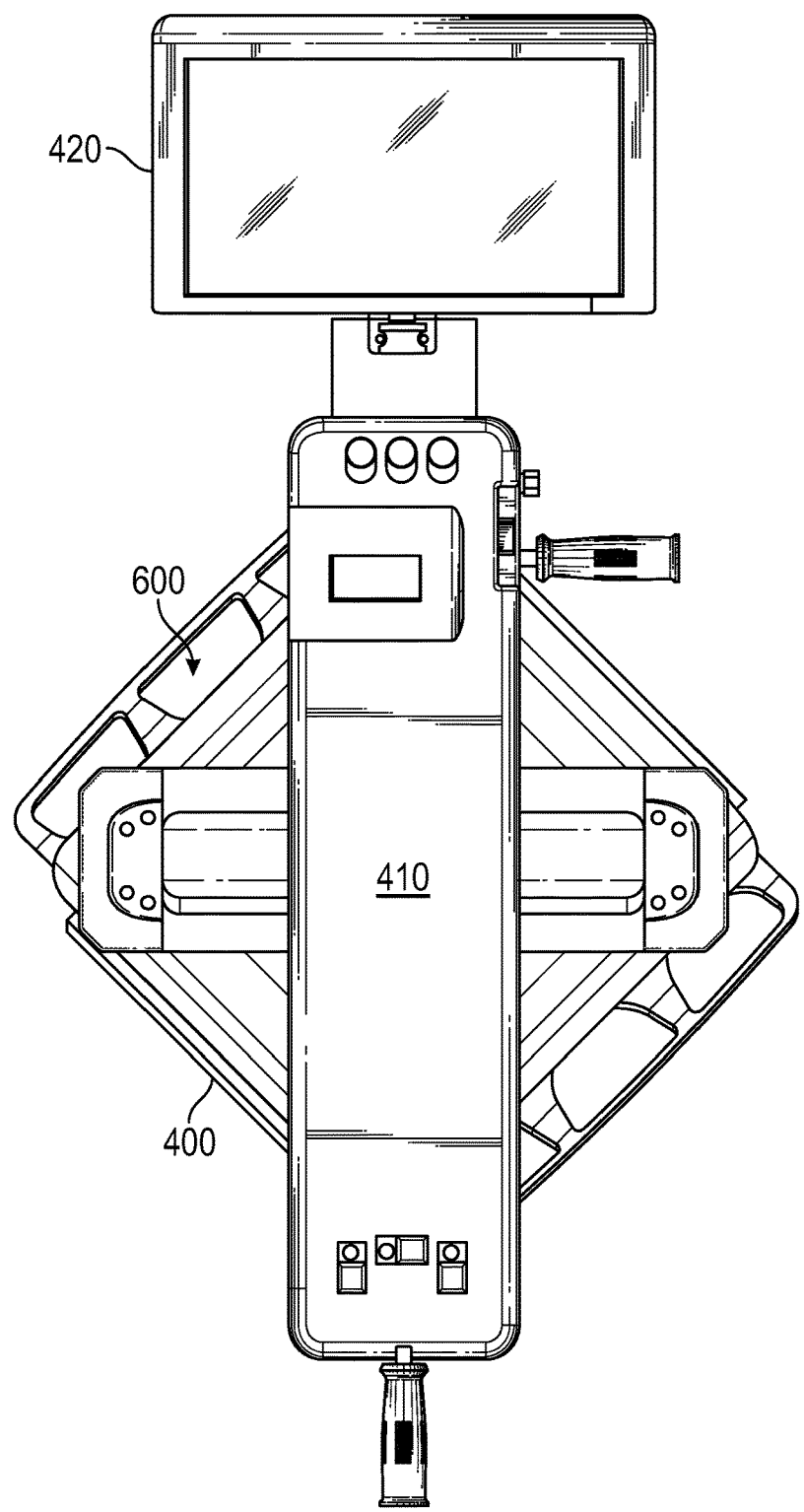
FIG. 6 shows a top view of the controller.

FIGS. 4-6 show an alternative embodiment of the controller. In FIG. 4, the simulated yoke 400 can be twisted, and the simulated head 410 can be moved up and down, thus allowing pan and tilt controls. Both of these controls are controlled by the handles. Handle 415 is pressed up and down to control up and down movement of the simulated light head, the so-called tilt of the light head. The handle 416 is used to control side to side movement of the yoke 400, so-called pan of the light head. Both the handles are located on the simulated light head, but can be used to control both pan and tilt. That in this embodiment, the tilt moves the simulated light head 410, but the pan moves the simulated yoke 400. In this embodiment, both handles are on the simulated light head, but each handle moves a different movable structure.

The operator can move the light head to multiple different positions. The monitor 420 shows the view that is seen by the light via the camera. The monitor 420 is hinged to the simulated head by a hinge 421. In this way, as the head moves, the monitor 421 can also be moved so that the operator can see the field-of-view of the light.

FIG. 5 shows a different position of the controller, and how when the simulated lighting head is moved, the monitor can be hinged so that the operator can still see the field of view of the light.

FIG. 6 shows the controller from above, showing the simulated head and monitor. The simulated yoke is placed on a support 600 that supports the lighting parts and their movements. That support can be located on a tripod.

Figure 7:
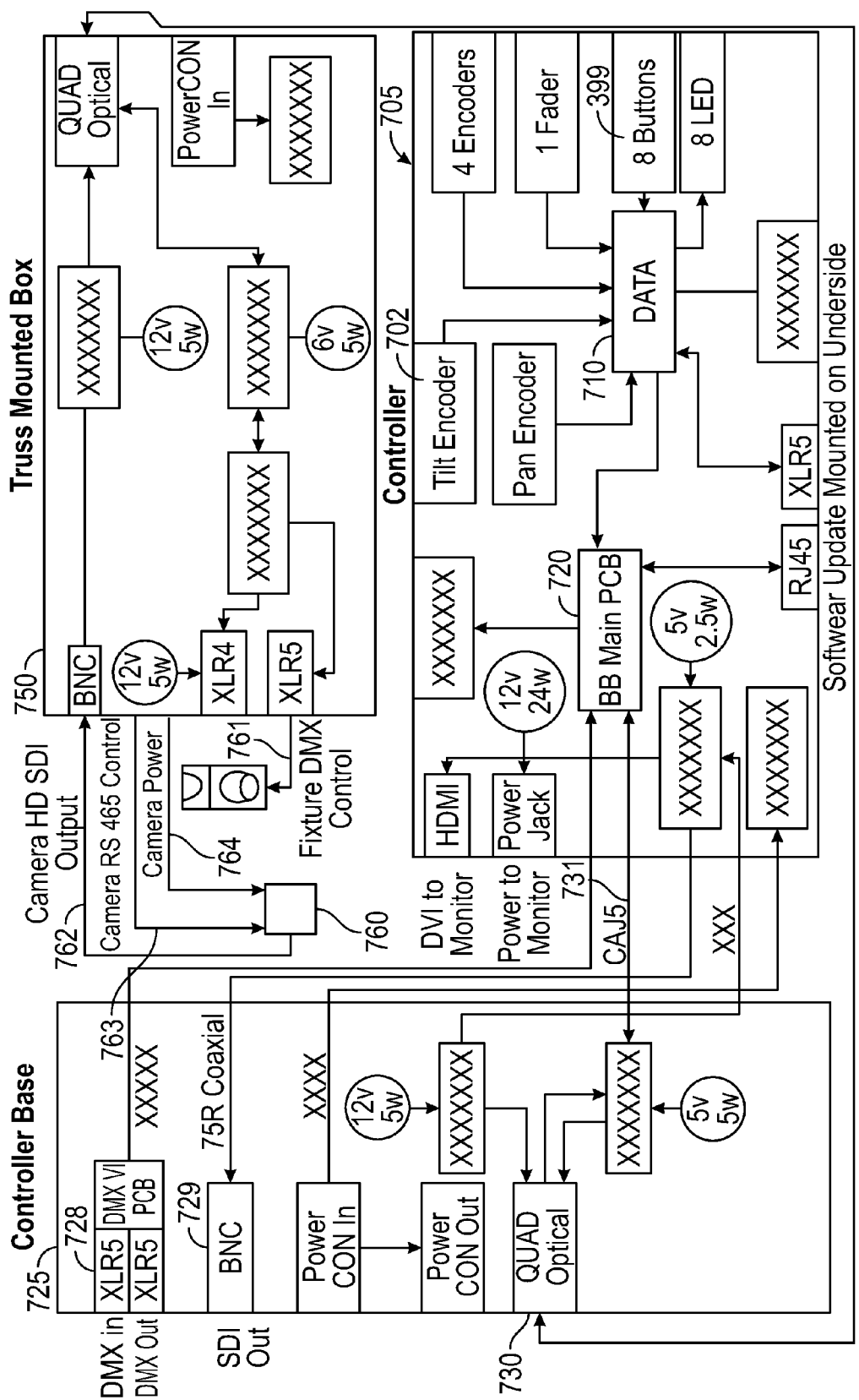
FIG. 7 shows a block diagram of the system.

FIG. 7 illustrates a detailed block diagram showing the connections between the different parts of the system. The controller 399 corresponds to the parts of the device that are movable. A pan encoder 701 and a tilt encoder 702 encode the pan and tilt movements caused by moving the controller. The controls 705, including buttons, fader and movement encoders are also acquired by the data acquiring unit 710. The controls are processed by the main controller board 720 which may be a processor board. All of the controls processed by the processor board 720 are sent to the controller base 725 that encodes the data from the controller into signals in a format to control the movement of the light 760.

The controller base 725 includes connections for control including a DMX (or other format) connection 728, an SDI or other format connection 729 as well as an optical connection 730. The DMX and SDI, for example, can go to an external monitor, while the optical input is connected to the camera in the controller via a connection 731 which can be for example a Cat 5, or Cat 6 connection or a coax connection or a multicore optical connection.

The data to and from the lamp is sent from the optical connection 730 over a fiber, e.g., a quad fiber.

The truss mounted box 750 interfaces to the fiber to exchange information with the controlled lamp 760. This can include the fixture DMX control 761, which is sent to the lamp to control the pan and tilt movement of the lamp by the movement of the remote control. The camera output (e.g., video) 762 is also received from the lamp, and passed to the monitor in the controller. In one embodiment, the truss box can receive controls on the fiber, and output DMX to control the lamp, and RS-485 to control the camera. Video from the High Definition Camera mounted on the fixture outputs HD-SDI in this embodiment at 1080i that enables the operator on the ground to see the stage from the same point of view as if the operator was sitting right next to the fixture. The truss box can also supply power for the camera.

Another embodiment describes the purpose built fixture intended for use entirely with the follow spot controller. In addition to CMY color mixing, this Remote Spot has been further optimized for followspot work by having two dedicated color correction wheels, a CTO, and a CTB Wheel. Both wheels are loaded up with a wide variety of color correction options. The CTO Wheel in one embodiment includes:

Minus Green filter
⅛ CTO
¼ CTO
½ CTO
¾ CTO
Full CTO.
The CTB Wheel is loaded with:
Minus Green filter
⅛ CTB
¼ CTB
½ CTB
¾ CTB
Full CTB.

Having CMY Color mixing along with the CTO and CTB wheels gives designers the ultimate in flexibility to dial in and tune the Remote Spot to their exact needs.

In another embodiment, the CTO and CTB are variable wheels and not just fixed filters.

Figure 8A:
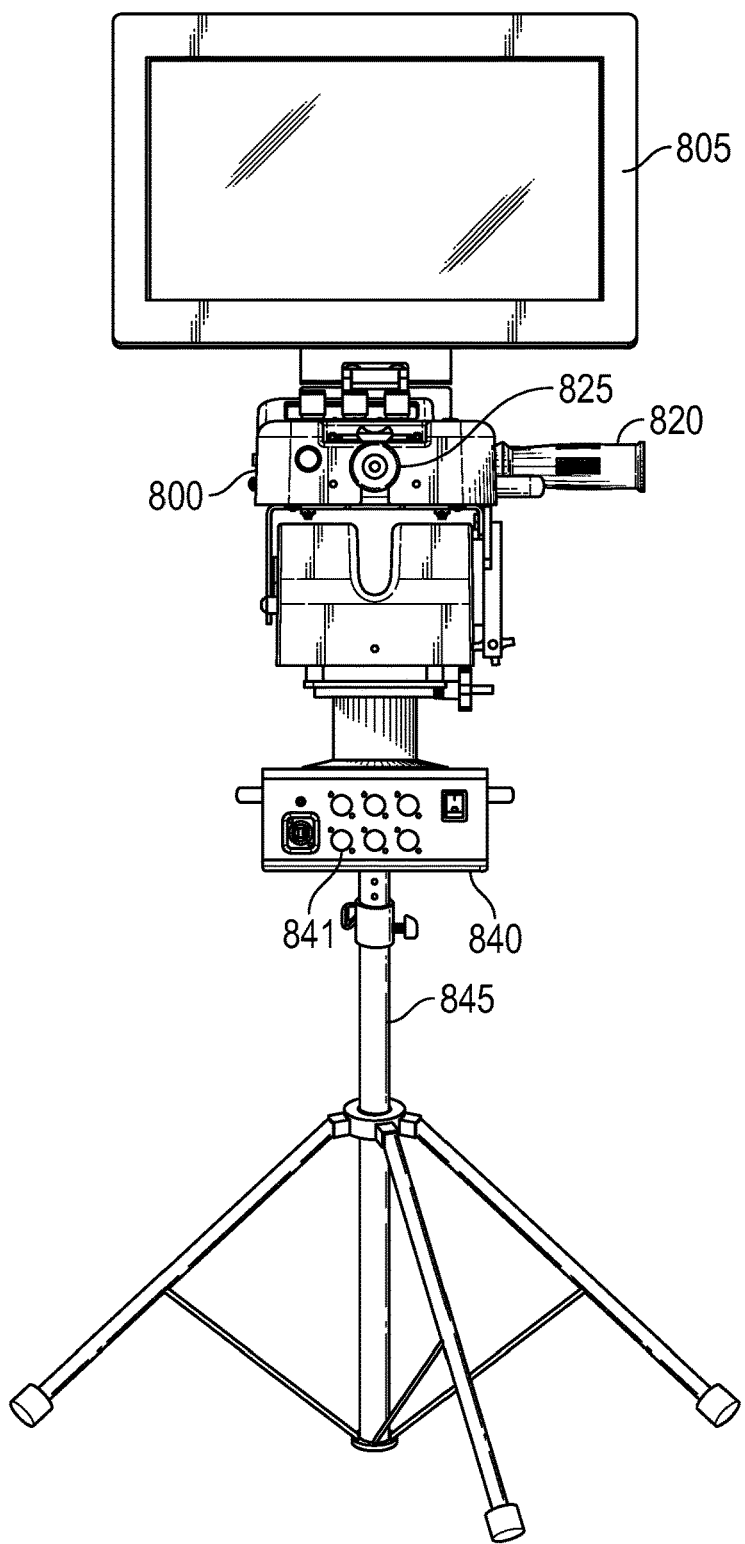
FIG. 8A-8C show an alternate embodiment of the controller.
Figure 8B:
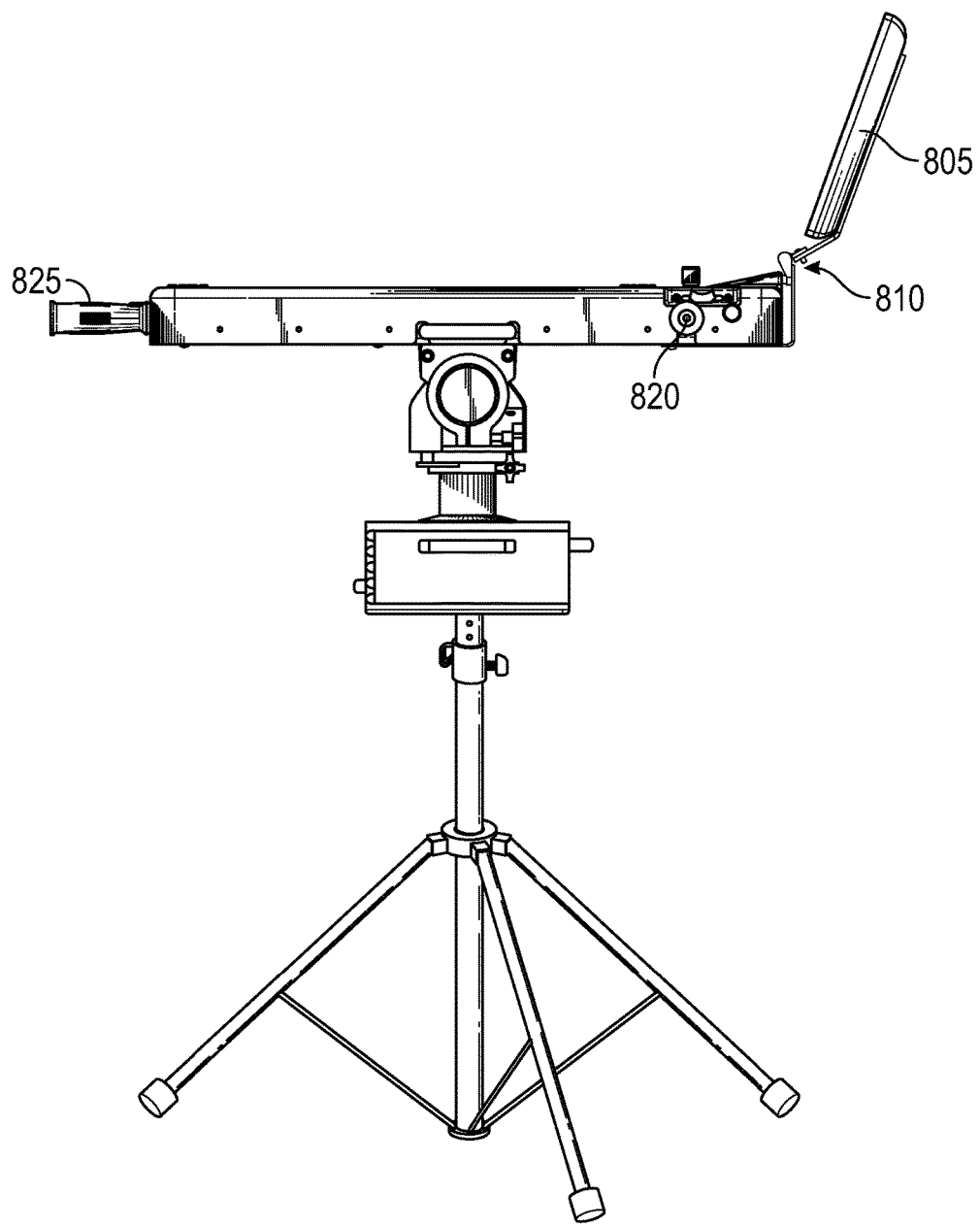
Figure 8C:
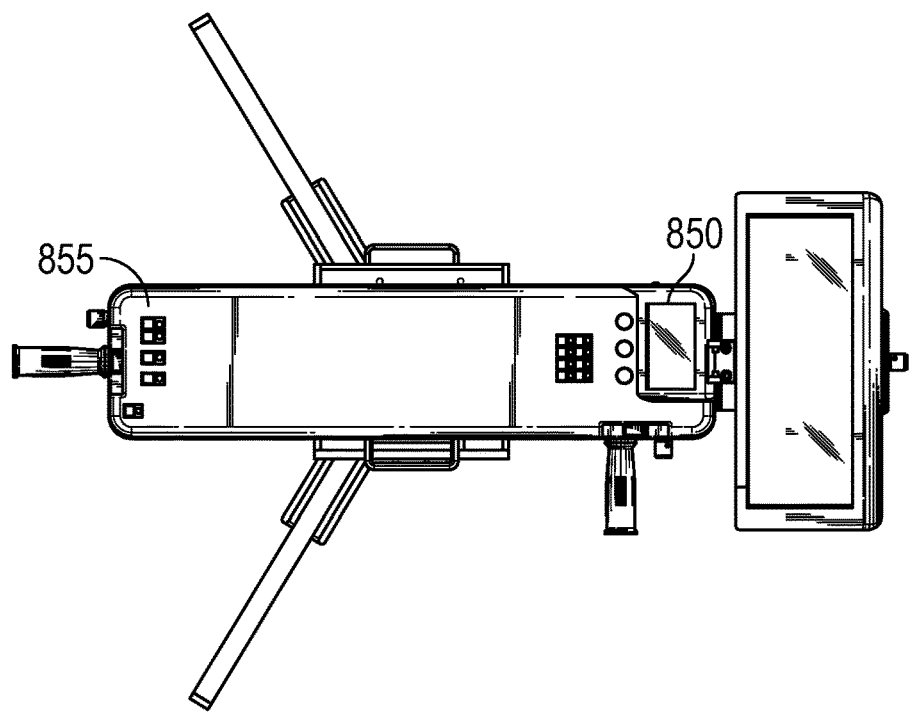

FIG. 8 *a*-8C show an alternative embodiment of the controller, from three different angles. The controller body 800 includes a display screen 805 connected thereto by a hinge 810. The hinge enables the screen 805 to be moved in any desired way depending on the movement of the body. The body can be moved in orthogonal directions, including up and down to tilt and side to side to pan. The body includes handles 820, 825 which enable holding the body in order to move it. The body is physically mounted on a control box or mounted on the whatever that connects to a control box that is mounted on a tripod assembly 845. The control box 840 may include all the electrical connections such as 841 which enable can communication with the remote light. FIG. 8C shows the view from above including the touchscreen controller 850, as well as other controls 855.

Figure 9:
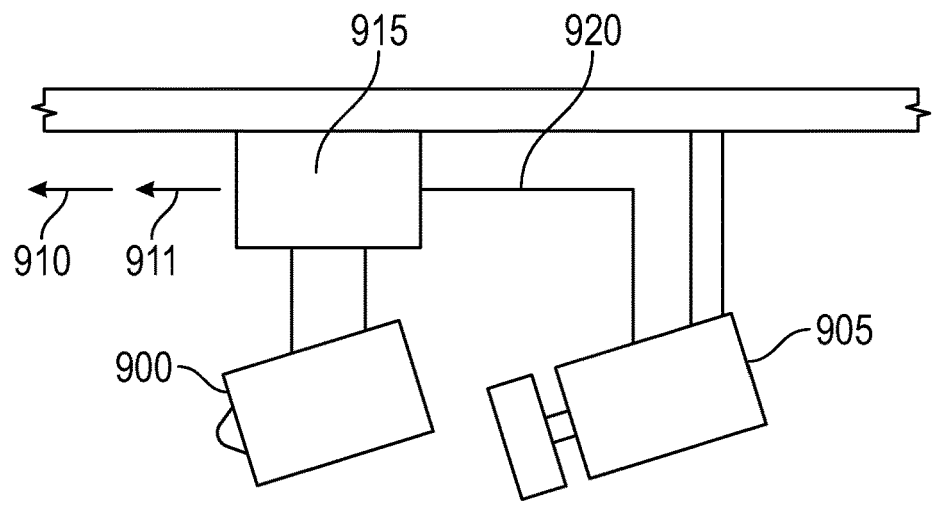
FIG. 9 shows an alternate embodiment where the camera is separate from the light.

According to an alternative embodiment, shown in FIG. 9, the camera 900 is physically separate from the light 905, with the control line 910 interfacing to a truss box 915 that provides pan and tilt control signals for the camera 900. That truss box also provides the signal including control and power 922 the light itself. In this embodiment, the video signal shown is 911 comes from the truss box received from the light, and need not be received from the light itself. 910 and 911 are shown as two different wires, however this may be on the same physical wire connection.

Other embodiments are intended to be encompassed within the invention. Moreover, the in invention is intended to include additional features such as processors, memory, and software. In one embodiment, the software of an existing fixture 205 is modified. In another embodiment, software is used which in essence hacks into the existing fixture in order to cause the fixture to react to the commands from the remote controller.

The controller is shown to have specified shapes and sizes, however other controller shapes can be used. Preferably, the controller is capable of movement in pan and tilt directions, to create the most intuitive control.

An embodiment described herein includes the display screen attached to the controller to move with the controller as the controller is moved to control the light. However in another embodiment, the display screen can be separate from the controller.

As described herein, multiple lights can be controlled with a single controller. A single controller can select which of multiple lights to control in one embodiment. The controller can also control multiple lights at the same time. In one embodiment, this control of the multiple lights may cause all of the multiple controlled lights to point parallel. The operator can select one of the lights, for example the mid-most one for example, and control that one, causing the other lights to point parallel to that one light. In another embodiment, the operator or the console can program information about the locations of the different lights, causing each of those different lights to point at a common location. The operator controls one of the lights, while the others of the lights control are controlled to point at a common pointing location, based on the single control.

In another embodiment, the controller includes software that automatically identifies an image of a target within the video. For example, that target could be a person or some other moving item. The software then attempts to find this target in further video that is received by the controlled luminaire. As the target moves, the software automatically moves the luminaire to keep that target within the center of the video screen. In this way, the target is automatically tracked without the operator's intervention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a web site. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for controlling a remotely located luminaire that is movable in pan and tilt directions, comprising:
    a controller for a remotely located movable luminaire, said controller having a first part which enables moving in a horizontal direction, and has a first movement encoding device that creates an horizontal movement signal indicative of the horizontal movement, and said controller having a second part that is separate from said first part and is movable in a vertical direction, and has a second movement encoding device that creates a vertical movement signal indicative of the vertical movement,
    first and second handles, which are held by a user to enable moving the controller in the first and second movement directions, said first and second handles both attached to said first part, and
    a display screen, also attached to said first part, and displaying a real time image of a field of view of the controlled luminaire as controlled by movement of said controller.

2. The device as in claim 1, further comprising electrical connections to said device, and a video connection to said device providing real-time movement information over the video connection.

3. The device as in claim 1,
    wherein the display screen is hinged relative to said first part to enable viewing the display screen at multiple positions of movement of said first part.

4. The device as in claim 1, further comprising controls for the remotely controlled luminaire, located on said first part.

5. The device as in claim 4, wherein said controls include controls for a camera adjacent to the luminaire which provides the real-time image, said controls being located on said first part.

6. The device as in claim 4, wherein the controls for the remotely controlled luminaire includes a brightness control for the luminaire, and increasing the brightness control on the luminaire causes a change of the brightness of the image on the display.

7. The device as in claim 4, wherein the controls select which of a plurality of different remotely controlled luminaires will be controlled by the controller.

8. The device as in claim 4, wherein the controls select plural different remotely controlled luminaire is to be controlled by the controller.

9. The device as in claim 5, wherein the controls include an exposure control for the camera.

10. The device as in claim 5, wherein the controls include a zoom control for the camera, and zooming the control for the camera causes an image displayed on the display to correspondingly zoom.

* * * * *